United States Patent [19]

Nakamura et al.

[11] Patent Number: 6,090,887

[45] Date of Patent: Jul. 18, 2000

[54] SILICONE RUBBER COMPOSITION FOR FLUORORESIN-COVERED FIXING ROLLS AND FLUORORESIN-COVERED FIXING ROLLS

[75] Inventors: Akito Nakamura; Yoshito Ushio, both of Chiba Prefecture, Japan

[73] Assignee: Dow Corning Toray Silicone Co., Ltd., Tokyo, Japan

[21] Appl. No.: 08/697,997

[22] Filed: Nov. 25, 1996

[30] Foreign Application Priority Data

Sep. 13, 1995 [JP] Japan .................................. 7-260851

[51] Int. Cl.⁷ .............................. C08L 83/05; C08L 83/07; C08G 77/12
[52] U.S. Cl. ........................ 524/862; 524/861; 524/588; 528/31; 528/32
[58] Field of Search .................... 524/862, 861; 528/31, 32

[56] References Cited

U.S. PATENT DOCUMENTS

| | | |
|---|---|---|
| 5,223,344 | 6/1993 | Sumpter et al. . |
| 5,360,858 | 11/1994 | Fujiki et al. ............................ 524/862 |
| 5,449,560 | 9/1995 | Antheunis et al. ..................... 524/862 |
| 5,711,072 | 1/1998 | Nakamura ............................ 29/895.32 |

FOREIGN PATENT DOCUMENTS

| | | |
|---|---|---|
| 0 517 524 A1 | 9/1992 | European Pat. Off. . |
| 74436 | 7/1978 | Japan . |
| 89785 | 6/1982 | Japan . |
| 52269 | 3/1984 | Japan . |
| 74578 | 4/1984 | Japan . |

*Primary Examiner*—Tae Yoon
*Attorney, Agent, or Firm*—Paula J. Lagattuta; Larry A. Milco

[57] ABSTRACT

Silicone rubber composition comprising an alkenyl-substituted diorganopolysiloxane, an inorganic filler, an organopolysiloxane that contains at least two silicon-bonded hydrogen atoms in each molecule, in a quantity that affords a value from 0.4 to 10 for the molar ratio of silicon-bonded hydrogen in the organopolysiloxane to alkenyl groups in the alkenyl-substituted diorganopolysiloxane, an organohydrogenpolysiloxane, in a quantity that affords a value from 0.01 to 0.5 for the molar ratio of silicon-bonded hydrogen in this component to alkenyl groups in the alkenyl-substituted diorganopolysiloxane, and a platinum catalyst. A fluororesin-covered fixing roll in which a fluororesin layer is placed over the circumference of a roll shaft with a silicone rubber layer interposed between the fluororesin layer and the roll shaft, wherein said silicone rubber composition is formed by curing the silicone rubber composition described above.

13 Claims, 1 Drawing Sheet

SILICONE RUBBER COMPOSITION FOR FLUORORESIN-COVERED FIXING ROLLS AND FLUORORESIN-COVERED FIXING ROLLS

BACKGROUND OF THE INVENTION

1. Field of the Invention

This invention relates to silicone rubber compositions for use in fluororesin-covered fixing rolls (hereinafter abbreviated in some cases as FFR silicone rubber compositions) and to fluororesin-covered fixing rolls. More particularly, this invention relates to an FFR silicone rubber composition that—even when cured at the relatively low temperatures necessary to avoid the development of wrinkles or creases in the surface of fluororesin-covered fixing rolls—is nevertheless capable of forming a silicone rubber with a low compression set and an excellent adherence to the roll shaft. The invention also relates to a highly reliable fluororesin-covered fixing roll.

2. Description of the Prior Art

Fluororesin-covered fixing rolls comprising a fluororesin layer formed on the circumference of a metal roll shaft across an intercalated layer of relatively low-durometer silicone rubber exhibit excellent toner release and make possible a reduction in equipment size and are therefore well-adapted for use in electrophotographic copiers, printers, facsimile machines, and the like (refer to Japanese Patent Application Laid Open (Kokai or Unexamined) Numbers Sho 53-74436 (1978), 57-89785 (1982), 59-74578 (1984), and 59-52269 (1984)).

Fluororesin-covered fixing rolls of this type are typically fabricated by preliminarily treating the circumference of the roll shaft with primer, inserting the treated roll shaft into a fluororesin tube, injecting a silicone rubber composition into the cavity created between the roll shaft and the tube, and then curing the silicone rubber composition. This process requires that the silicone rubber composition be cured at relatively high temperatures, for example, at 150° C. to 200° C., in order to achieve a satisfactory adhesion between the roll shaft and the silicone rubber layer. However, due to the difference in coefficient of thermal expansion between the silicone rubber composition and fluororesin, this heating episode frequently causes the appearance of creases or wrinkles in the surface of the resulting fixing roll. This problem is particularly noticeable with the use of silicone rubber compositions that yield low-durometer silicone rubbers, for example, with a JIS A durometer not exceeding 20.

When, on the other hand, the silicone rubber composition is cured at the relatively low temperatures, for example, 80° C. to 120° C., that avoid creasing in the surface of the fluororesin-covered fixing roll, the result is a poor adherence and intimacy of contact with the roll shaft and fluororesin that are in contact with the silicone rubber composition during the course of its cure. As a consequence, even the preliminary treatment of the roll shaft with primer does not yield much improvement in the adherence. Thus, while fluororesin-covered fixing rolls fabricated by a relatively low-temperature cure of the silicone rubber composition will not suffer from surface creasing, they will suffer from a poor reliability due to a ready tendency for delamination to occur at the roll shaft/silicone rubber layer interface.

As a result of extensive investigations directed to solving the problems described above, the present inventors discovered that an addition reaction-curing silicone rubber composition containing two different types of SiH-functional organopolysiloxane can be cured even at relatively low temperatures to give a silicone rubber with a low compression set and in particular an excellent adherence and intimacy of contact with a roll shaft and fluororesin in contact with the composition during its cure. With respect to these SiH-functional organopolysiloxanes, the inventors discovered in particular that the use of specific quantities of organopolysiloxane containing relatively large amounts of SiH can increase the adherence without significantly changing the physical properties of the silicone rubber product—most importantly without significantly changing its durometer. The present invention was achieved based on these discoveries.

In specific terms, then, the present invention takes as its object the introduction of an FFR silicone rubber composition that—even when cured at the relatively low temperatures necessary to avoid the development of creases in the surface of fluororesin-covered fixing rolls—can form a relatively low-durometer silicone rubber with a low compression set and an excellent adherence to the roll shaft. Another, corresponding object of the present invention is to provide highly reliable fluororesin-covered fixing rolls.

The silicone rubber composition according to the present invention is intended for the formation of the silicone rubber layer in fluororesin-covered fixing rolls in which a fluororesin layer is placed over the circumference of a roll shaft with a silicone rubber layer interposed between the fluororesin layer and the roll shaft.

SUMMARY OF THE INVENTION

The silicone rubber composition of the present invention comprises:

(A) 100 parts by weight of a diorganopolysiloxane having an average of at least two silicon-bonded alkenyl groups per molecule and containing an average at least 0.5 silicon-bonded alkenyl groups per molecule in pendant positions on the molecular chain;

(B) 5 to 500 parts by weight of a filler;

(C) an organopolysiloxane having an average of at least two silicon-bonded hydrogen atoms per molecule, in a quantity that affords a value from 0.4 to 10 for the molar ratio of silicon-bonded hydrogen in component (C) to alkenyl groups in component (A), said organopolysiloxane having the general formula

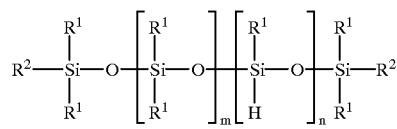

(D) an organohydrogenpolysiloxane with the general formula

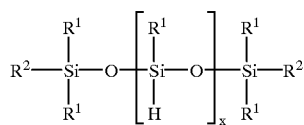

said organohydrogenpolysiloxane having an average of at least two silicon-bonded hydrogen atoms in each molecule, in a quantity that affords a value from 0.01 to 0.5 for the molar ratio of silicon-bonded hydrogen atoms in component (D) to alkenyl groups in component (A); and (E) platinum catalyst in a catalytic quantity;
wherein $R^1$ is a monovalent hydrocarbon group, $R^2$ is a hydrogen atom or a monovalent hydrocarbon group, m is a positive integer, n is an integer with a value of zero or greater, x is a positive integer, and both the organopolysiloxane and the organohydrogenpolysiloxane are free of alkenyl groups.

The present invention also provides a fluororesin-covered fixing roll having a silicone rubber layer that is formed by curing the silicone rubber composition described above.

Figure 1:
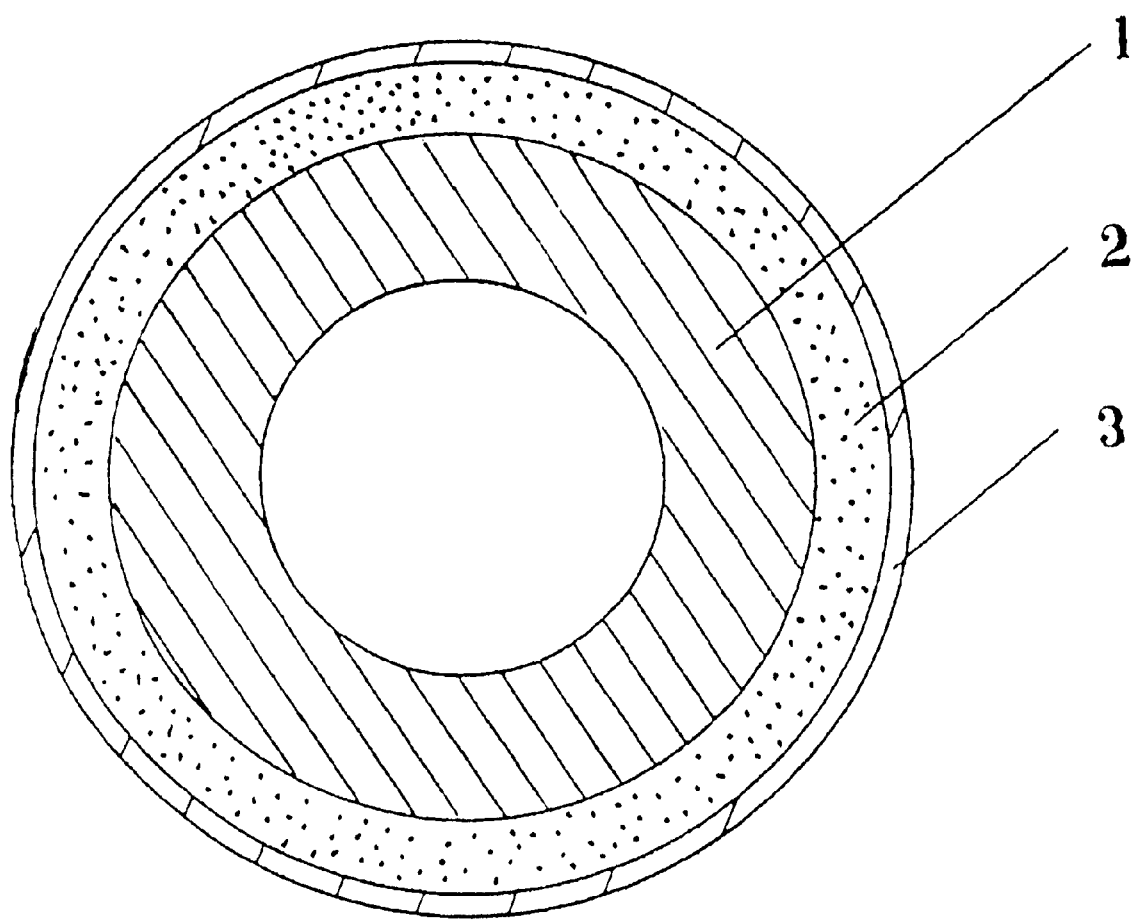
FIG. 1 contains a cross section of a fluororesin-covered fixing roll according to the present invention.

REFERENCE NUMBERS 1 roll shaft
2 silicone rubber layer
3 fluororesin layer

DETAILED DESCRIPTION OF THE INVENTION

The FFR silicone rubber composition according to the present invention will be explained in greater detail below.

The diorganopolysiloxane (A), which is the base ingredient of the present composition, characteristically contains at least two silicon-bonded alkenyl in each molecule and an average at least 0.5 silicon-bonded alkenyl in pendant position on the molecular chain. Component (A) must contain on average at least 0.5 silicon-bonded alkenyl in pendant position on the molecular chain in order to obtain silicone rubber with a low compression set. Component (A) must also contain an average of at least two silicon-bonded alkenyl groups per molecule in order to obtain a thorough cure by the composition. In preferred embodiments, the silicon-bonded alkenyl in component (A) is selected from the group consisting of vinyl, allyl, butenyl, pentenyl, hexenyl, and heptenyl. Vinyl is particularly preferred. The non-alkenyl silicon-bonded groups in component (A) are exemplified by alkyl groups, such as methyl, ethyl, propyl, butyl, pentyl, hexyl, and so forth; aryl groups such as phenyl, tolyl, xylyl, and so forth; aralkyl groups such as benzyl, phenethyl, and so forth; haloalkyl groups such as 3-chloropropyl, 3,3,3-trifluoropropyl, and so forth; alkoxy groups such as methoxy, ethoxy, and so forth; and the hydroxyl group. The methyl group is specifically preferred among the preceding. The viscosity of component (A) at 25° C. is preferably at least 1,000 centipoise, wherein the range from 1,000 to 1,000,000 centipoise is more preferred and the range from 10,000 to 500,000 centipoise is most preferred. The diorganopolysiloxane (A) is exemplified by trimethylsiloxy-endblocked methylvinyl-siloxane-dimethylsiloxane copolymers, trimethylsiloxy-endblocked methylvinylpolysiloxanes, trimethylsiloxy-endblocked methylvinylsiloxane-methylphenylsiloxane copolymers, trimethylsiloxy-endblocked methylvinylsiloxane-dimethylsiloxane-methylphenylsiloxane copolymers, trimethylsiloxy-endblocked methylvinylsiloxane-dimethylsiloxane-methyl(3,3,3-trifluoropropyl)siloxane copolymers, dimethylvinylsiloxy-endblocked methylvinylsiloxane-dimethylsiloxane copolymers, dimethylvinylsiloxy-endblocked methylvinylpolysiloxanes, dimethylvinylsiloxy-endblocked methylvinylsiloxane-methylphenylsiloxane copolymers, dimethylvinylsiloxy-endblocked methylvinylsiloxane-dimethylsiloxane-methylphenylsiloxane copolymers, silanol-endblocked methylvinylsiloxane-dimethylsiloxane copolymers, silanol-endblocked methylvinylpolysiloxanes, silanol-endblocked methylvinylsiloxane-dimethylsiloxane-methylphenylsiloxane copolymers, and silanol-endblocked methylvinylsiloxane-dimethylsiloxane-methyl(3,3,3-trifluoropropyl)siloxane copolymers. These diorganopolysiloxanes may be used singly or in combinations of two or more selections. A portion of component (A) can be diorganopolysiloxane that does not contain pendant silicon-bonded alkenyl, such as, for example, dimethylvinylsiloxy-endblocked dimethylpolysiloxanes, dimethylvinylsiloxy-endblocked dimethylsiloxane-methylphenylsiloxane copolymers, and dimethylvinylsiloxy-endblocked dimethylsiloxane-methyl(3,3,3-trifluoropropyl)siloxane copolymers.

The inorganic filler (B) functions to impart properties such as mechanical strength, thermal conductivity, or electrical conductivity to the silicone rubber afforded by the cure of the subject composition. Component (B) is exemplified by precipitated silica micropowders, fumed silica micropowders, calcined silica micropowders, fumed titanium oxide micropowders, crushed quartz micropowders, diatomaceous earth micropowders, aluminosilicate micropowders, iron oxide micropowders, zinc oxide micropowders, calcium carbonate micropowders, carbon black micropowders, alumina micropowders, aluminum hydroxide micropowders, silver micropowders, and nickel micropowders. These inorganic fillers may be directly admixed in an untreated form; or may be admixed after a preliminary surface treatment with an organosilicon compound such as an organoalkoxysilane, organochlorosilane, or organodisilazane; or may be subjected to surface treatment with such an organosilicon compound while being mixed into component (A).

Component (B) is admixed at from 5 to 500 weight parts per 100 weight parts component (A) and is preferably admixed at from 10 to 300 weight parts per 100 weight parts component (A). The ultimately obtained silicone rubber will have a poor mechanical strength when component (B) is added at less than 5 weight parts per 100 weight parts component (A). The preparation of the silicone rubber composition becomes quite difficult when more than 500 weight parts component (B) is used.

The organopolysiloxane (C), which functions to cure the present composition, characteristically is defined by the following general formula

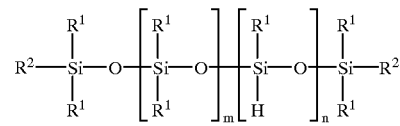

and contains an average of at least two silicon-bonded hydrogens per molecule. $R^1$ in the aforementioned formula represents monovalent hydrocarbon groups excluding alkenyl groups, and is exemplified by alkyl groups such as methyl, ethyl, propyl, butyl, pentyl, hexyl, and so forth; aryl groups such as phenyl, tolyl, xylyl, and so forth; aralkyl groups such as benzyl, phenethyl, and so forth; and haloalkyl groups such as 3-chloropropyl, 3,3,3-trifluoropropyl, and so forth. The methyl group is specifically preferred. $R^2$ in the formula represents the hydrogen atom and monovalent hydrocarbon groups excluding alkenyl groups. The monovalent hydrocarbon groups in this case are exemplified by the same groups as elaborated above. The subscript m in the preceding formula is a positive integer, while the subscript n is an integer with a value of 0 or greater. In order to produce silicone rubber with a relatively low durometer, e.g., a JIS A durometer of no more than 20, the organopolysiloxane (C) preferably contains 2 to 4 silicon-bonded hydrogen in each molecule. The viscosity of component (C) at 25° C. is preferably from 3 to 10,000 centipoise and more preferably is from 3 to 300 centipoise. The organopolysiloxane (C) is exemplified by dimethylhydrogensiloxy-endblocked dimethylpolysiloxanes, dimethylhydrogensiloxy-endblocked dimethylsiloxane-methylphenylsiloxane copolymers, trimethylsiloxy-endblocked dimethylsiloxane-methylhydrogensiloxane copolymers, trimethylsiloxy-endblocked dimethylsiloxane-methylphenylsiloxane-methylhydrogensiloxane copolymers, and dimethylhydrogensiloxy-endblocked dimethylsiloxane-methylhydrogensiloxane copolymers. These organopolysiloxanes may be used singly or as combinations of two or more selections.

Component (C) is added in a quantity that affords a value from 0.4 to 10 and preferably from 0.6 to 5 for the molar ratio of silicon-bonded hydrogen in component (C) to alkenyl in component (A). The resulting composition will not evidence a thorough cure at values below 0.4 for this molar ratio. Bubbles may appear in the ultimately obtained silicone rubber when this molar ratio has a value in excess of 10.

The organohydrogenpolysiloxane (D) functions to impart good adherence to the relatively low-temperature cured silicone rubber and, like component (C), also functions to cure the present composition. Component (D) characteristically is defined by the following general formula

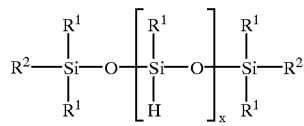

and contains at least two silicon-bonded hydrogen atoms in each molecule. $R^1$ in this formula represents monovalent hydrocarbon groups excluding alkenyl groups and is exemplified by the same groups as elaborated above. $R^2$ in this formula represents the hydrogen atom and monovalent hydrocarbon groups excluding alkenyl groups. The monovalent hydrocarbon groups in this case are exemplified by the same groups as elaborated above. The subscript x in the preceding formula is a positive integer whose value preferably is from 5 to 1,000 and more preferably is from 5 to 100. The viscosity of component (D) at 25° C. is preferably from 3 to 10,000 centipoise and more preferably is from 3 to 300 centipoise. This organohydrogenpolysiloxane (D) is exemplified by trimethylsiloxy-endblocked methylhydrogenpolysiloxanes and dimethylhydrogensiloxy-endblocked methylhydrogenpolysiloxanes. These organohydrogenpolysiloxanes may be used singly or in combinations of two or more selections.

Component (D) is added in a quantity that affords a value from 0.01 to 0.5 and preferably from 0.05 to 0.4 for the molar ratio of silicon-bonded hydrogen in component (D) to alkenyl in component (A). A satisfactory adherence cannot be imparted to the silicone rubber after afforded by relatively low temperature cure when this molar ratio is below 0.01. When this ratio exceeds 0.5 the ultimately obtained silicone rubber will exhibit a very large durometer, which will typically make the rubber undesirable for use in fluororesin-covered fixing rolls with their requirement for a silicone rubber with a relatively low durometer, i.e., a JIS A durometer no greater than 20.

The platinum catalyst (E) is a catalyst that accelerates the cure of the subject composition. The platinum catalyst (E) is exemplified by platinum black, platinum-on-alumina powder, platinum-on-silica powder, platinum-on-carbon powder, chloroplatinic acid, alcohol solutions of chloroplatinic acid, platinum/olefin complexes, platinum/vinylsiloxane complexes, and also by micropowder comprising a platinum catalyst as described above dispersed in a thermoplastic organic resin such as a methyl methacrylate resin, polycarbonate resin, polystyrene resin, silicone resin, and so forth.

Component (E) is added in a catalytic quantity and may be added in any quantity sufficient to cure the composition under consideration. In specific terms, the addition of component (E) preferably provides from 0.01 to 500 weight parts and more preferably from 0.1 to 100 weight parts platinum metal in component (E) for each one million weight parts component (A).

A curing inhibitor can be added to the composition according to the present invention on an optional basis in order to improve the composition's storage stability and/or its handling characteristics. The curing inhibitor is exemplified by acetylenic compounds such as 3-methyl-1-butyn-3-ol, 3,5-dimethyl-1-hexyn-3-ol, 3-phenyl-1-butyn-3-ol, and so forth; ene-yne compounds such as 3-methyl-3-penten-1-yne, 3,5-dimethyl-3-hexen-1-yne, and so forth; and also 1,3,5,7-tetramethyl-1,3,5,7-tetravinylcyclotetrasiloxane; 1,3,5,7-tetramethyl-1,3,5,7-tetrahexenylcyclotetrasiloxane; triazoles such as benzotriazole, etc.; phosphines; mercaptans; hydrazines; and so forth. The curing inhibitor is preferably added at from 0.001 to 5 weight parts per 100 weight parts component (A).

In order to adjust the durometer of the ultimately obtained silicone rubber, the composition according to the present invention preferably contains as an optional component diorganopolysiloxane that contains neither Si-bonded alkenyl nor Si-bonded hydrogen. The Si-bonded groups in such a diorganopolysiloxane are exemplified by alkyl groups such as methyl, ethyl, propyl, butyl, pentyl, hexyl, and so forth; aryl groups such as phenyl, tolyl, xylyl, and so forth; aralkyl groups such as benzyl, phenethyl, and so forth; haloalkyl groups such as 3-chloropropyl, 3,3,3-trifluoropropyl, and so forth; alkoxy groups such as methoxy, ethoxy, and so forth; and the hydroxyl group. The methyl group is specifically preferred here. In order to obtain good handling characteristics for the corresponding silicone rubber composition and fabricate high-quality fluororesin-covered fixing rolls, the viscosity of this diorganopolysiloxane at 25° C. is preferably at least 100 centipoise and particularly preferably is from 1,000 to 10,000,000 centipoise. The subject diorganopolysiloxane is exemplified by trimethylsiloxy-endblocked dimethylpolysiloxanes, trimethylsiloxy-endblocked dimethylsiloxane-methylphenylsiloxane copolymers, trimethylsiloxy-endblocked dimethylsiloxane-methyl(3,3,3-trifluoropropyl)siloxane copolymers, silanol-endblocked dimethylpolysiloxanes, silanol-endblocked dimethylsiloxane-methylphenylsiloxane copolymers, and silanol-endblocked dimethylsiloxane-methyl(3,3,3-trifluoropropyl)siloxane copolymers. These diorganopolysiloxanes may be used singly or as combinations of two or more selections. In order to adequately reduce the durometer of the silicone rubber while avoiding bleed out by this component from the silicone rubber, this diorganopolysiloxane is preferably added at from 5 to 100 weight parts and particularly preferably at from 10 to 50 weight parts per 100 weight parts component (A).

In order to further reduce the compression set of the silicone rubber afforded by the cure of the composition according to the present invention, the composition will preferably contain a very small amount of a six-member ring compound having an unsaturated carbon-nitrogen bond in the ring, for example, pyridine, pyrazine, pyrimidine, 1,3,5-triazine, etc., or the derivative of such a compound. The usual pigments, heat stabilizers, flame retardants, etc., may be introduced into the composition according to the present invention on an optional basis within a range that does not impair the object of the present invention.

The composition according to the present invention is prepared by mixing the above-described components (A) to (E) and any optional components to homogeneity. The method for preparing the composition according to the present invention is exemplified by mixing components (A) to (E) and any optional components to homogeneity in a known mixing device such as a 2-roll mill, kneader mixer, "ROSS®" mixer, etc. "ROSS® is a registered trade mark of the Charles Ross & Sons Company of Hauppauge, N.Y.

The fluororesin-covered fixing roll according to the present invention will be explained in greater detail below.

A fluororesin-covered fixing roll according to the present invention is presented in FIG. 1. As shown in FIG. 1, the fluororesin-covered fixing roll according to the present invention is characterized by the presence of a fluororesin layer 3 on the circumference of a roll shaft 1 with a silicone rubber layer 2 interposed between the fluororesin layer and roll shaft wherein said silicone rubber layer 2 is formed by the cure of the composition described hereinbefore. The technique for fabricating a fixing roll according to the present invention is exemplified by mounting a metal roll shaft, e.g., of iron or aluminum, in a mold designed for roll fabrication, installing a fluororesin tube along the interior wall of the mold, injecting the silicone rubber composition into the cavity between the roll shaft and fluororesin tube, and finally curing the silicone rubber composition. The fluororesin preferably has a thickness of no more than 0.1 mm and particularly preferably has a thickness within the range from 0.1 to 50 micrometers. The fluororesin is itself exemplified by polytetrafluoroethylene resins (PTFE), tetrafluoroethylene-perfluoroalkyl vinyl ether copolymer resins (PFA), fluorinated ethylene-propylene copolymer resins (FEP), ethylene-tetrafluoroethylene copolymer resins (ETFE), polychlorotrifluoroethylene copolymer resins (PCTFE), polyvinylidene fluoride resins (PVDF), polyvinyl fluoride resins (PVF), ethylene-chlorotrifluoroethylene copolymer resins (ECTFE), and tetrafluoroethylene-hexafluoropropylene copolymer resins (FEP). The silicone rubber layer preferably has a thickness of 2 to 30 mm. The circumference of the roll shaft is preferably preliminarily treated with primer in order to obtain additional improvements in the adherence between the roll shaft and silicone rubber layer. The compression molders, transfer molders, and injection molders ordinarily used for molding liquid silicone rubber compositions can be used for the pressurized introduction of the silicone rubber composition into the cavity between the roll shaft and fluororesin tube. A very low curing temperature for the silicone rubber composition results in a slow cure rate and thus a substantially reduced productivity for fabrication of the fluororesin-covered fixing roll. On the other hand, a very high curing temperature causes the development of creases in the surface of the resulting fluororesin-covered fixing roll. As a result of these considerations, the curing temperature is preferably from 70° C. to 140° C. and particularly preferably from 90° C. to 120° C. An additional heat treatment at 150° C. to 250° C. is preferred for the purpose of obtaining additional reductions in the compression set of the silicone rubber afforded by the relatively low-temperature cure. This heat treatment will not cause creasing in the surface of the fluororesin-covered fixing roll because the silicone rubber has a smaller coefficient of thermal expansion than the uncured composition. The herein described fluororesin-covered fixing roll according to the present invention is highly reliable, and its good adherence between the roll shaft and silicone rubber layer make it ideal for use as a fixing roll in electrophotographic copiers, printers, facsimile machines, and the like.

EXAMPLES

The FFR silicone rubber composition and fluororesin-covered fixing roll according to the present invention will be explained in greater detail through working examples. The viscosity values reported in the examples were measured at 25° C. The silicone rubbers were evaluated by the following methods.

Durometer of the Silicone Rubbers

The silicone rubber composition was cured in a hot press at 120° C. for 30 minutes to yield a silicone rubber, which was then additionally heated in an oven at 200° C. for 4 hours. The durometer of the resulting silicone rubber was measured using the JIS A hardness meter specified in JIS K 6301.

Compression Set of the Silicone Rubbers

The silicone rubber composition was cured in a hot press at 120° C. for 30 minutes to yield a silicone rubber, which was then additionally heated in an oven at 200° C. for 4 hours. The compression set of the resulting silicone rubber was measured using the compression set test method specified in JIS K 6301. The heating temperature during the compression test was 180° C. and the heating time was 22 hours.

Adherence of the Silicone Rubbers

A commercial primer was uniformly coated on the surface of an aluminum test panel and was then thoroughly dried by holding in an oven for 30 minutes at 150° C. The silicone rubber composition was coated onto the treated test panel and cured for 30 minutes with a hot press at 100° C. to yield the silicone rubber adhered to the panel. The silicone rubber was then peeled from the test panel surface at a 90° angle, and the proportion of the area of cohesive failure by the silicone rubber in the overall area of adhesion was determined (% cohesive failure). The % cohesive failure was similarly determined for a curing temperature of 150° C.

Volume Resistivity of the Silicone Rubbers

The volume resistivity of the silicone rubber prepared as described above was measured according to the volume resistivity test method specified in JIS C 2123.

Example 1

Using a "ROSS®" mixer, 100 weight parts trimethylsiloxy-endblocked methylvinylsiloxane-dimethylsiloxane copolymer (viscosity=40,000 centipoise, vinyl content=0.12 weight %) with the formula

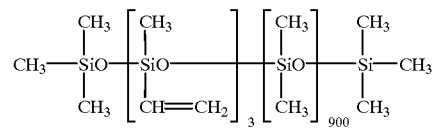

and 30 weight parts crushed quartz micropowder with an average particle size of 5 micrometers were mixed to homogeneity. The following were then mixed to homogeneity into the mixture thus prepared to yield a silicone rubber composition: 6 weight parts dimethylhydrogensiloxy-endblocked dimethylpolysiloxane (viscosity=38 centipoise, silicon-bonded hydrogen content=0.065 weight %) with the formula

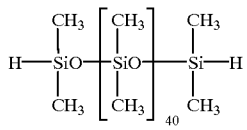

thereby giving a value of 0.9 for the molar ratio of silicon-bonded hydrogen in this dimethylpolysiloxane to the vinyl in the above methylvinylsiloxane-dimethylsiloxane copolymer; 0.06 weight part trimethylsiloxy-endblocked methylhydrogenpolysiloxane (viscosity=20 centipoise, silicon-bonded hydrogen content=1.47 weight %) with the formula

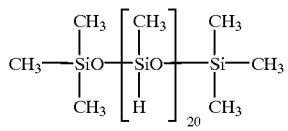

thereby giving a value of 0.2 for the molar ratio of silicon-bonded hydrogen in this methylhydrogenpolysiloxane to vinyl in the above methylvinylsiloxane-dimethylsiloxane copolymer; and 0.5 weight part isopropanolic chloroplatinic acid solution (content of platinum metal=1 weight %).

The silicone rubber afforded by the cure of this silicone rubber composition had a durometer (JIS A) of 7 and a compression set of 5%. This silicone rubber gave 100% cohesive failure at both curing temperatures (100° C. and 150° C.).

Commercial primer was uniformly coated on the circumference of an iron cylindrical roll shaft with a diameter of 10 mm, and the primer was thoroughly dried by holding in an oven at 150° C. for 30 minutes. Commercial primer was also uniformly coated on the interior wall of a tube of tetrafluoroethylene-perfluoroalkyl perfluorovinyl ether copolymer (film thickness=50 micrometers) whose interior wall had been preliminarily treated with alkali. The primer was thoroughly dried by then holding the tube for 1 hour at room temperature. The roll shaft was thereafter mounted in a mold designed for roll fabrication and the tube was installed along the interior wall of the mold. The aforementioned silicone rubber composition was subsequently injected into the cavity between the roll shaft and tube and was cured at 100° C. for 30 minutes to yield a fluororesin-covered fixing roll with a silicone rubber layer thickness of 10 mm. Inspection of the fixing roll surface found it to be free of creases or wrinkles, while evaluation of the adherence between the roll shaft and silicone rubber layer determined this adherence to be excellent. Creasing still did not appear in the surface of this fixing roll when it was subsequently heated for 4 hours in an oven at 200° C.

This fixing roll was installed in an electrophotographic copier and 150,000 copies were continuously run off on A4 copy paper. No paper creasing or paper jams occurred, and the image was clearly copied.

For purposes of comparison, a fluororesin-covered fixing roll was fabricated by curing at 150° C. for 30 minutes. Creasing was observed on the surface of this fixing roll.

Comparative Example 1

A silicone rubber composition was prepared as in Example 1, but in this case omitting the trimethylsiloxy-endblocked methylhydrogenpolysiloxane that was used in Example 1.

This silicone rubber composition cured into a silicone rubber with a durometer (JIS A) of 6 and a compression set of 5%. This silicone rubber gave 20% cohesive failure at a curing temperature of 100° C. and 100% cohesive failure at a curing temperature of 150° C.

This silicone rubber composition was also used to fabricate a fluororesin-covered fixing roll as in Example 1. This fixing roll, which was fabricated by curing for 30 minutes at 100° C., did not evidence surface creasing, but a partial delamination was observed at the interface between the roll shaft and the silicone rubber layer.

For purposes of comparison, a fluororesin-covered fixing roll was fabricated by curing at 150° C. for 30 minutes. Creasing was observed on the surface of this fixing roll.

Comparative Example 2

A silicone rubber composition was prepared as in Example 1, but in this case changing the addition of the trimethylsiloxy-endblocked methylhydrogenpolysiloxane used in Example 1 to 0.3 weight part, thereby giving a value of 1.0 for the molar ratio of silicon-bonded hydrogen in this methylhydrogenpolysiloxane to the vinyl in the methylvinylsiloxane-dimethylsiloxane copolymer.

This silicone rubber composition cured into a silicone rubber with a durometer (JIS A) of 20, thus confirming a substantial increase in this property.

Example 2

Using a "ROSS®" mixer, 100 weight parts dimethylvinylsiloxy-endblocked methylvinylsiloxane-dimethylsiloxane copolymer (viscosity=40,000 centipoise, vinyl content=0.16 weight %) with the formula

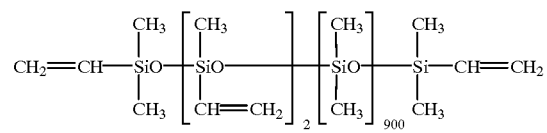

15 weight parts crushed quartz micropowder with an average particle size of 5 micrometers, and 8 weight parts carbon black ("DENKA®" Acetylene Black) were mixed to homogeneity. "DENKA®" is a registered trademark of Denki Kagaku Kogyo Kabushiki Kaisha of Tokyo, Japan. The following were then mixed to homogeneity into the mixture thus prepared to yield a silicone rubber composition: 5 weight parts trimethylsiloxy-endblocked dimethylsiloxane-methylhydrogensiloxane copolymer (viscosity=10 centipoise, silicon-bonded hydrogen content=0.24 weight %) with the formula

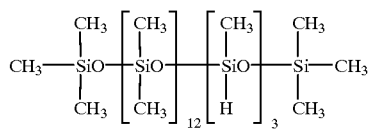

thereby giving a value of 2.0 for the molar ratio of silicon-bonded hydrogen in this dimethylsiloxane-methylhydrogensiloxane copolymer to the vinyl in the above methylvinylsiloxane-dimethylsiloxane copolymer; 0.04 weight part dimethylhydrogensiloxy-endblocked methylhydrogenpolysiloxane (viscosity=30 centipoise, silicon-bonded hydrogen content=1.65 weight %) with the formula

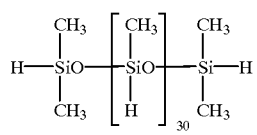

thereby giving a value of 0.11 for the molar ratio of silicon-bonded hydrogen in this methylhydrogenpolysiloxane to vinyl in the above methylvinylsiloxane-dimethylsiloxane copolymer; and 0.5 weight part isopropanolic chloroplatinic acid solution (content of platinum metal=1 weight %).

The silicone rubber afforded by the cure of this silicone rubber composition had a durometer (JIS A) of 12, a volume resistivity of $1\times10^4$ ohm-cm, and a compression set of 8%. This silicone rubber gave 100% cohesive failure at both curing temperatures (100° C. and 150° C.).

This silicone rubber composition was also used to fabricate a fluororesin-covered fixing roll as in Example 1. This fixing roll, which was fabricated by curing for 30 minutes at 100° C., did not evidence surface creasing. Moreover, the adherence between the roll shaft and silicone rubber layer was excellent. Creasing still did not appear in the surface of this fixing roll when it was subsequently heated for 4 hours at 200° C.

This fixing roll was installed in an electrophotographic copier and 150,000 copies were continuously run off on A4 copy paper. No paper creasing or paper jams occurred, and the image was clearly copied.

For purposes of comparison, a fluororesin-covered fixing roll was fabricated by curing at 150° C. for 30 minutes. Creasing was observed on the surface of this fixing roll.

Comparative Example 3

A silicone rubber composition was prepared as in Example 2, but in this case without using the dimethylhydrogensiloxy-endblocked methylhydrogenpolysiloxane that was used in Example 2.

The silicone rubber afforded by the cure of this silicone rubber composition had a durometer (JIS A) of 11, a volume resistivity of $1\times10^4$ ohm-cm, and a compression set of 8%. This silicone rubber gave 50% cohesive failure at a curing temperature of 100° C. and 100% cohesive failure at a curing temperature of 150° C.

This silicone rubber composition was also used to fabricate a fluororesin-covered fixing roll as in Example 1. This fixing roll, which was fabricated by curing for 30 minutes at 100° C., did not evidence surface creasing. However, partial delamination was observed at the interface between the roll shaft and silicone rubber layer.

For purposes of comparison, a fluororesin-covered fixing roll was fabricated by curing at 150° C. for 30 minutes. Creasing was observed on the surface of this fixing roll.

Comparative Example 4

A silicone rubber composition was prepared as in Example 2, but in this case adding 0.4 weight part of the dimethylhydrogensiloxy-endblocked methylhydrogenpolysiloxane that was used in Example 2. This gave a value of 1.1 for the molar ratio of silicon-bonded hydrogen in this methylhydrogenpolysiloxane to the vinyl in the methylvinylsiloxane-dimethylsiloxane copolymer.

This silicone rubber composition cured into a silicone rubber with a durometer (JIS A) of 25, thus confirming a substantial increase in this property.

Example 3

Using a "ROSS®" mixer, 100 weight parts trimethylsiloxy-endblocked methylvinylsiloxane-dimethylsiloxane copolymer (viscosity=40,000 centipoise, vinyl content=0.12 weight %) with the formula

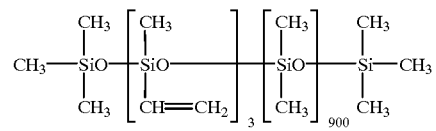

and 90 weight parts crushed quartz micropowder with an average particle size of 5 micrometers were mixed to homogeneity. The following were then mixed to homogeneity into the mixture thus prepared to yield a silicone rubber composition: 20 weight parts trimethylsiloxy-endblocked dimethylpolysiloxane with a viscosity of 100,000 centipoise; 6 weight parts dimethylhydrogensiloxy-endblocked dimethylpolysiloxane (viscosity=38 centipoise, silicon-bonded hydrogen content=0.065 weight %) with the formula

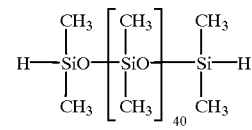

thereby giving a value of 0.9 for the molar ratio of silicon-bonded hydrogen in this dimethylpolysiloxane to the vinyl in the above methylvinylsiloxane-dimethylsiloxane copolymer; 0.1 weight part trimethylsiloxy-endblocked methylhydrogenpolysiloxane (viscosity=20 centipoise, silicon-bonded hydrogen content=1.47 weight %) with the formula

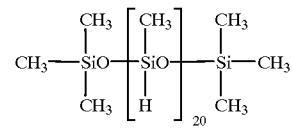

thereby giving a value of 0.3 for the molar ratio of silicon-bonded hydrogen in this methylhydrogenpolysiloxane to vinyl in the above methylvinylsiloxane-dimethylsiloxane copolymer; and 0.5 weight part isopropanolic chloroplatinic acid solution (content of platinum metal=1 weight %).

The silicone rubber afforded by the cure of this silicone rubber composition had a durometer (JIS A) of 10 and a compression set of 5%. This silicone rubber gave 100% cohesive failure at both curing temperatures (100° C. and 150° C.).

This silicone rubber composition was also used to fabricate a fluororesin-covered fixing roll as in Example 1. This fixing roll, which was fabricated by curing for 30 minutes at 100° C., did not evidence surface creasing. Moreover, the adherence between the roll shaft and silicone rubber layer was excellent. Creasing still did not appear in the surface of this fixing roll when it was subsequently heated for 4 hours at 200° C.

This fixing roll was installed in an electrophotographic copier and 150,000 copies were continuously run off on A4 copy paper. No paper creasing or paper jams occurred, and the image was clearly copied.

For purposes of comparison, a fluororesin-covered fixing roll was fabricated by curing at 150° C. for 30 minutes. Creasing was observed on the surface of this fixing roll.

Comparative Example 5

A silicone rubber composition was prepared as in Example 3, but in this case without using the trimethylsiloxy-endblocked methylhydrogenpolysiloxane that was used in Example 3.

The silicone rubber afforded by the cure of this silicone rubber composition had a durometer (JIS A) of 9 and a compression set of 5%. This silicone rubber gave 20% cohesive failure at a curing temperature of 100° C. and 100% cohesive failure at a curing temperature of 150° C.

This silicone rubber composition was also used to fabricate a fluororesin-covered fixing roll as in Example 1. This fixing roll, which was fabricated by curing for 30 minutes at 100° C., did not evidence surface creasing. However, partial delamination was observed at the interface between the roll shaft and silicone rubber layer.

For purposes of comparison, a fluororesin-covered fixing roll was fabricated by curing at 150° C. for 30 minutes. Creasing was observed on the surface of this fixing roll.

Comparative Example 6

A silicone rubber composition was prepared as in Example 3, but in this case adding 2 weight parts of the dimethylhydrogensiloxy-endblocked dimethylpolysiloxane that was used in Example 3, thereby giving a value of 0.3 for the molar ratio of silicon-bonded hydrogen in this dimethylpolysiloxane to the vinyl in the methylvinylsiloxane-dimethylsiloxane copolymer, and adding 0.3 weight part of the trimethylsiloxy-endblocked methylhydrogenpolysiloxane, thereby giving a value of 0.9 for the molar ratio of silicon-bonded hydrogen in this methylhydrogenpolysiloxane to the vinyl in the methylvinylsiloxane-dimethylsiloxane copolymer.

This silicone rubber composition cured into a silicone rubber with a durometer (JIS A) of 25, thus confirming a substantial increase in this property.

Example 4

Using a "ROSS®" mixer, 100 weight parts dimethylvinylsiloxy-endblocked methylvinylsiloxane-dimethylsiloxane copolymer (viscosity=40,000 centipoise, vinyl content=0.16 weight %) with the formula

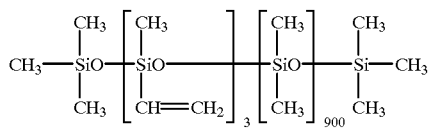

30 weight parts crushed quartz micropowder with an average particle size of 5 micrometers, and 8 weight parts carbon black ("DENKA®" Acetylene Black) were mixed to homogeneity. The following were then mixed to homogeneity into the mixture thus prepared to yield a silicone rubber composition: 20 weight parts trimethylsiloxy-endblocked dimethylpolysiloxane with a DENKA® viscosity of 300,000 centipoise, 4 weight parts trimethylsiloxy-endblocked dimethylsiloxane-methylhydrogensiloxane copolymer (viscosity=10 centipoise, silicon-bonded hydrogen content= 0.24 weight %) with the formula

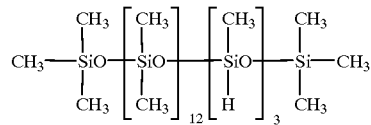

thereby giving a value of 1.7 for the molar ratio of silicon-bonded hydrogen in this dimethylsiloxane-methylhydrogensiloxane copolymer to the vinyl in the above methylvinylsiloxane-dimethylsiloxane copolymer; 0.05 weight part dimethylhydrogensiloxy-endblocked methylhydrogenpolysiloxane (viscosity=30 centipoise, silicon-bonded hydrogen content=1.65 weight %) with the formula

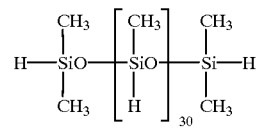

thereby giving a value of 0.14 for the molar ratio of silicon-bonded hydrogen in this methylhydrogenpolysiloxane to vinyl in the above methylvinylsiloxane-dimethylsiloxane copolymer; and 0.5 weight part isopropanolic chloroplatinic acid solution (content of platinum metal=1 weight %).

The silicone rubber afforded by the cure of this silicone rubber composition had a durometer (JIS A) of 15, a volume resistivity of $1\times10^4$ ohm-cm, and a compression set of 8%. This silicone rubber gave 100% cohesive failure at both curing temperatures (100° C. and 150° C.).

This silicone rubber composition was also used to fabricate a fluororesin-covered fixing roll as in Example 1. This fixing roll, which was fabricated by curing for 30 minutes at 100° C., did not evidence surface creasing. Moreover, the adherence between the roll shaft and silicone rubber layer was excellent. Creasing still did not appear in the surface of this fixing roll when it was subsequently heated for 4 hours at 200° C.

This fixing roll was installed in an electrophotographic copier and 150,000 copies were continuously run off on A4 copy paper. No paper creasing or paper jams occurred, and the image was clearly copied.

For purposes of comparison, a fluororesin-covered fixing roll was fabricated by curing at 150° C. for 30 minutes. Creasing was observed on the surface of this fixing roll.

Comparative Example 7

A silicone rubber composition was prepared as in Example 4, but in this case without using the dimethylhydrogensiloxy-endblocked methylhydrogenpolysiloxane that was used in Example 4.

The silicone rubber afforded by the cure of this silicone rubber composition had a durometer (JIS A) of 14, a volume resistivity of $1\times10^4$ ohm-cm, and a compression set of 8%. This silicone rubber gave 50% cohesive failure at a curing temperature of 100° C. and 100% cohesive failure at a curing temperature of 150° C.

This silicone rubber composition was also used to fabricate a fluororesin-covered fixing roll as in Example 1. This fixing roll, which was fabricated by curing for 30 minutes at 100° C., did not evidence surface creasing. However, partial delamination was observed at the interface between the roll shaft and silicone rubber layer.

For purposes of comparison, a fluororesin-covered fixing roll was fabricated by curing at 150° C. for 30 minutes. Creasing was observed on the surface of this fixing roll.

Even when cured at the relatively low temperatures necessary to avoid the development of wrinkles or creases in the surface of fluororesin-covered fixing rolls, the FFR silicone rubber composition according to the present invention is characteristically able to form a silicone rubber with a low compression set and an excellent adherence to the roll shaft. The present invention also provides a highly reliable fluororesin-covered fixing roll through the use of this silicone rubber composition in fixing roll fabrication.

That which is claimed is:

1. A silicone rubber composition comprising:
   (A) 100 parts by weight of a diorganopolysiloxane having an average of at least two silicon-bonded alkenyl groups per molecule and containing an average at least 0.5 silicon-bonded alkenyl groups per molecule in pendant positions on the molecular chain;
   (B) 5 to 500 parts by weight of a filler;
   (C) an organopolysiloxane having an average of at least two silicon-bonded hydrogen atoms per molecule, in a quantity that affords a value from 0.4 to 10 for the molar ratio of silicon-bonded hydrogen atoms in component (C) to alkenyl groups in component (A), said organopolysiloxane having the general formula

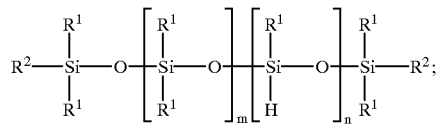

(D) an organohydrogenpolysiloxane with the general formula

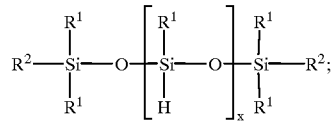

said organohydrogenpolysiloxane having an average of at least two silicon-bonded hydrogen atoms per molecule, in a quantity that affords a value from 0.01 to 0.5 for the molar ratio of silicon-bonded hydrogen atoms in component (D) to alkenyl groups in component (A); and (E) platinum catalyst in a catalytic quantity;
   wherein $R^1$ is a monovalent hydrocarbon group, $R^2$ is a hydrogen atom or a monovalent hydrocarbon group, m is a positive integer, n is an integer with a value of zero or greater, x is a positive integer, and both the organopolysiloxane and the organohydrogenpolysiloxane are free of alkenyl groups.

2. The silicone rubber composition of claim 1 wherein the silicon-bonded alkenyl groups of component (A) are individually selected from the group consisting of vinyl, allyl, butenyl, pentenyl, hexenyl and heptenyl.

3. The silicone rubber composition of claim 1 wherein the viscosity at 25° C. of component (A) is 1,000 to 1,000,000 centipoise.

4. The silicone rubber composition of claim 3 wherein the viscosity at 25° C. of component (A) is 10,000 to 50,000 centipoise.

5. The silicone rubber composition of claim 1 wherein component (B) is present in an amount ranging from 10 to 300 weight parts per 100 weight parts of component (A).

6. The silicone rubber composition of claim 1 wherein $R^1$ is individually selected from the group consisting of alkyl groups, aryl groups, aralkyl groups and haloalkyl groups.

7. The silicone rubber composition of claim 1 wherein $R^2$ is individually selected from the group consisting of hydrogen atoms, alkyl groups, aryl groups, aralkyl groups and haloalkyl groups.

8. The silicone rubber composition of claim 1 wherein component (C) contains an average of 2 to 4 silicon-bonded hydrogen atoms per molecule.

9. The silicone rubber composition of claim 1 wherein the viscosity at 25° C. of component (C) is 3 to 10,000 centipoise.

10. The silicone rubber composition of claim 1 wherein the molar ratio of silicon-bonded hydrogen atoms in component (C) to alkenyl groups in component (A) is 0.6 to 5.

11. The silicone rubber composition of claim 1 wherein x is 5 to 1000.

12. The silicone rubber composition of claim 1 wherein the viscosity at 25° C. of component (D) is 3 to 10,000 centipoise.

13. The silicone rubber composition of claim 1 wherein the molar ratio of silicon-bonded hydrogen atoms in component (D) to alkenyl groups in component (A) is 0.05 to 0.4.

* * * * *